Figure 1:
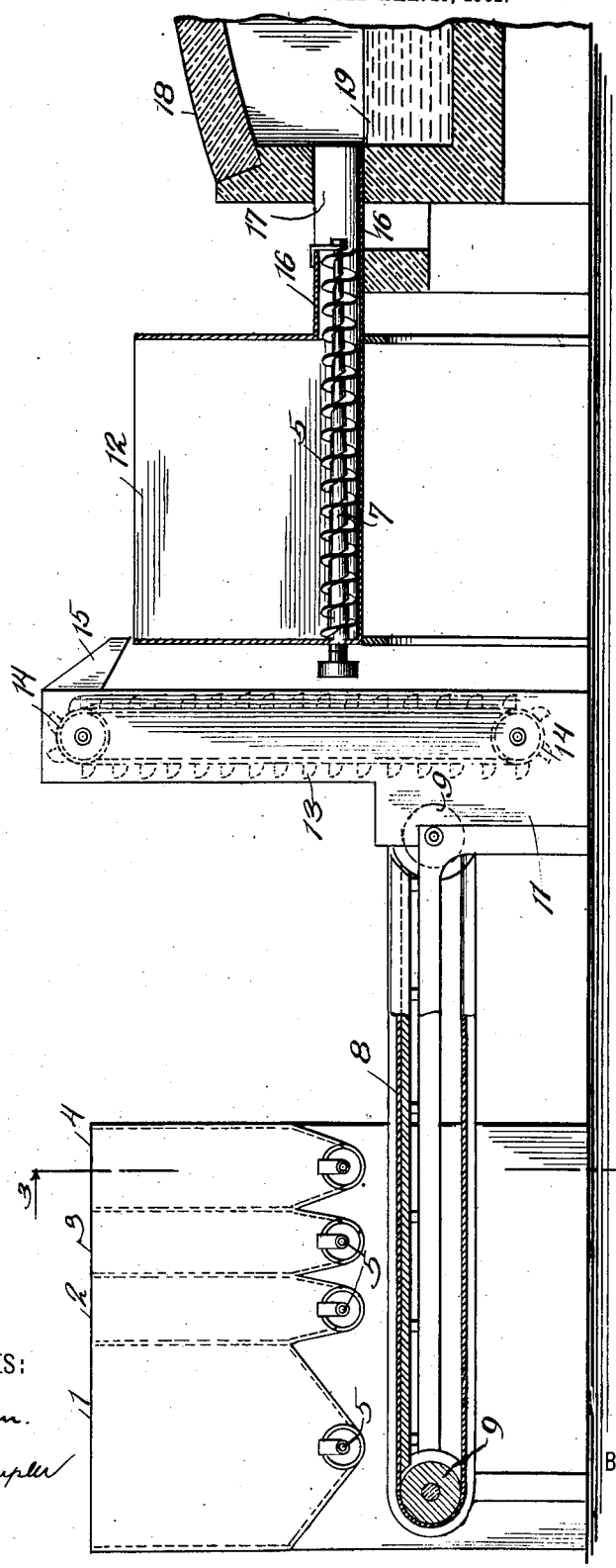

No. 826,139. PATENTED JULY 17, 1906.
H. M. BROOKFIELD.
DEVICE FOR MIXING INGREDIENTS FOR MAKING GLASS AND FOR FEEDING THEM TO FURNACES.
APPLICATION FILED MAR. 15, 1902.

2 SHEETS—SHEET 1.

WITNESSES:
Sidney Mann.
John O. Gempler

INVENTOR
Henry M. Brookfield
BY Kenyon & Kenyon
ATTORNEYS

No. 826,139. PATENTED JULY 17, 1906.
H. M. BROOKFIELD.
DEVICE FOR MIXING INGREDIENTS FOR MAKING GLASS AND FOR FEEDING THEM TO FURNACES.
APPLICATION FILED MAR. 15, 1902.
2 SHEETS—SHEET 2.
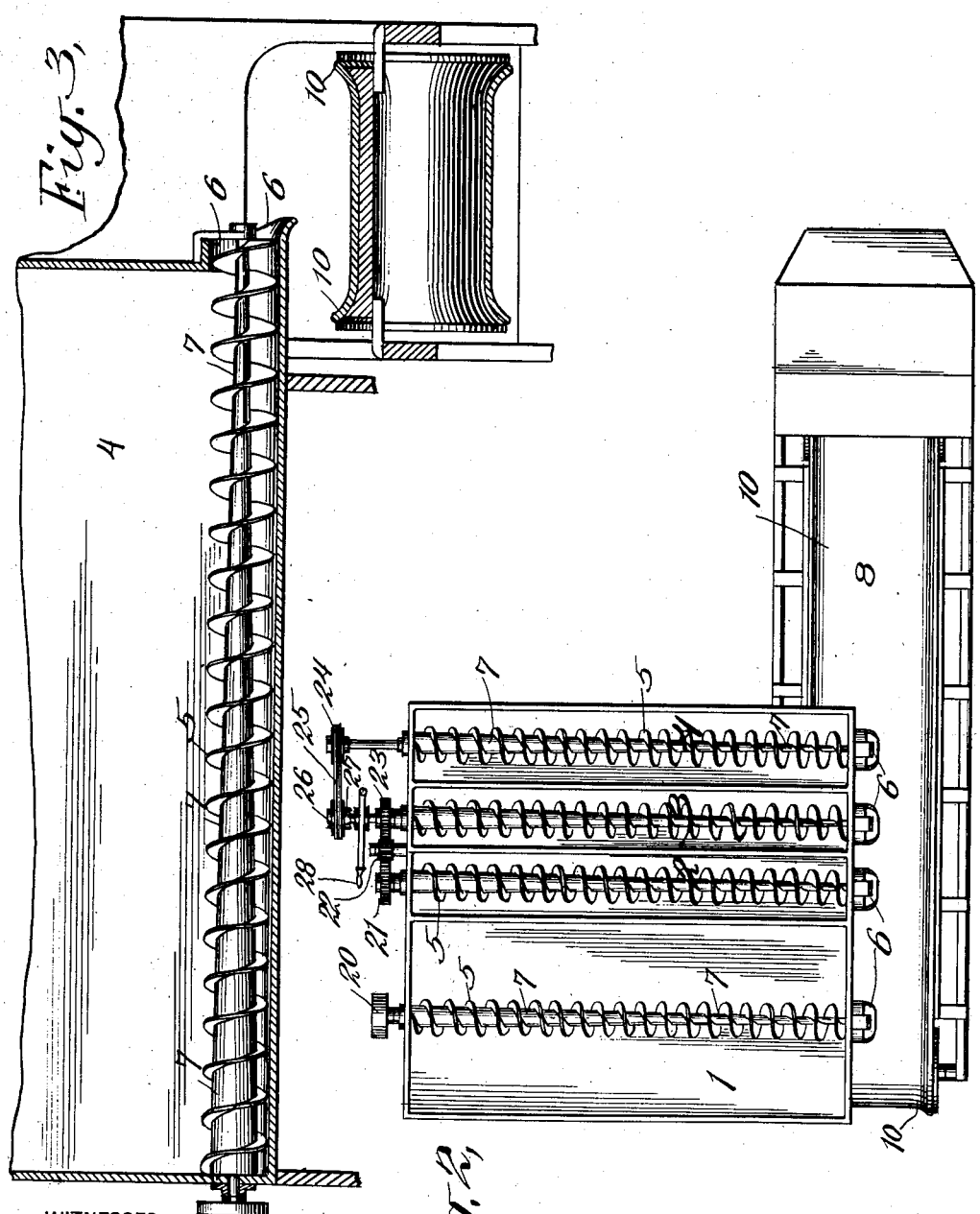

UNITED STATES PATENT OFFICE.

HENRY M. BROOKFIELD, OF NEW YORK, N. Y.

DEVICE FOR MIXING INGREDIENTS FOR MAKING GLASS AND FOR FEEDING THEM TO FURNACES.

No. 826,139.	Specification of Letters Patent.	Patented July 17, 1906.

Application filed March 15, 1902. Serial No. 98,310.

*To all whom it may concern:*

Be it known that I, HENRY M. BROOKFIELD, a citizen of the United States, and a resident of the city, county, and State of New York, have invented certain new and useful Improvements in Devices for Mixing Ingredients for Making Glass and for Feeding Them to a Furnace, of which the following is a specification.

My invention relates to devices for mixing the necessary ingredients for making glass and for feeding a mixture of such ingredients to a furnace.

The object of my invention is to provide improved means for automatically mixing the necessary ingredients for making glass and for mixing them in the proper proportions and for mixing them thoroughly; also, to provide a means for automatically feeding the mixture of such ingredients to a furnace.

It consists of the novel devices and combinations herein shown and described.

In the drawings accompanying this specification, and forming a part hereof, I have shown the preferred form or embodiment of my invention, and I will now proceed to describe the same.

Referring to such drawings, Figure 1 is an elevation, partly in section, of apparatus containing my improvement in its preferred form. Fig. 2 is a plan view of a part of the said apparatus, and Fig. 3 is a cross-section through one of the hoppers and the receiver.

Referring to the embodiment of my invention shown in the drawings, 1, 2, 3, and 4 form a series of hoppers for the different ingredients out of which the glass is to be made. Preferably these hoppers are made of somewhat varying sizes to correspond approximately to the relative proportions of the materials used. For example, hopper 1 is made much larger than any of the other hoppers and is used for the sand. Hopper 2 is used for the soda, for example, hopper 3 for the lime, and hopper 4 for the cullet. These hoppers are each provided with a screw 5, arranged in the bottom of each hopper and running the length of the hopper, as shown in Figs. 2 and 3. These screws are provided with any suitable means for rotating them for the purpose of feeding the material contained in the hopper along and out of one side of the hopper through a discharge-orifice 6. (Shown in Figs. 2 and 3.) Each hopper is provided with one of these discharge-orifices arranged at the discharge end of the screw. Each screw is made with a core 7, which tapers toward the discharge end of the screw. The tapering form of this core causes the material in the hopper to be taken evenly and equally from all parts of the length of the hopper. It also tends to make the feed even and to push the material evenly and regularly out of the hopper.

A receiver common to all the hoppers is provided and adapted to receive the different ingredients as they are discharged from the different hoppers. This receiver may be of any suitable form. In the form shown in the drawings it consists of an endless belt 8, passing around pulleys 9 9 and driven by any suitable means. (Not shown.) Belt 8 is preferably raised at its edges 10, as shown in Fig. 3, for preventing the material from spilling off from the belt. As is shown, belt 8 carries the ingredients fed out from the different hoppers into a receptacle 11. From here they are carried by any suitable means to a hopper 12, whence they are automatically fed to the furnace. As shown, the means employed for carrying the mixture of ingredients from receptacle 11 to the hopper 12 consist of an endless chain carrying buckets 13, the chain running over pulleys 14 14. Any suitable means may be employed for conveying the different ingredients after their discharge from the hoppers 1, 2, 3, and 4 to the hopper 12, and, if desired, hoppers 1, 2, 3, and 4 could be placed directly above the hopper 12 and the ingredients be permitted to fall directly into that hopper, although I prefer to use an intermediate receiver like the endless belt 8, as in this way the ingredients are more thoroughly mixed.

From buckets 13 the materials are passed through chute 15 into hopper 12. This hopper is provided along its bottom with a similar screw 5, made with a tapering core 7, as already described. Hopper 12 is provided at its right-hand end with a discharge-orifice. In the form shown this consists of a conduit 16, through which screw 5 is partly extended. The lower part of conduit 16 extends from this point into an opening 17 in the wall of the furnace 18. The space between the end of screw 5 and the opening 17 of the furnace is left for the insertion of a stopper—such, for instance, as a block of clay—into opening 17 of the furnace when it is desired to stop the feeding of the ingredients to the furnace and to close up the opening.

19 represents the molten glass in the furnace.

Any suitable means may be employed for driving the screws 5, and such means may, if desired, be connected together and be arranged so as to drive the different screws at predetermined rates relative to one another. I prefer, however, not to connect all of them, but, for example, to drive the screw of hopper 1 through pulley 20 from any suitable source of power. The screw of hopper 2 is driven through gear-wheel 21 from any suitable source of power, (not shown,) and this through idle gear 22 and gear 23 on the shaft of screw 5 of hopper 3 drives the latter. By varying the number of teeth in those different gear-wheels in any desired manner the two screws may be driven at any speed relatively to each other which may be desired. The screw 5 of hopper 4 is shown as driven through a pulley 24 on its shaft, belt 25, and pulley 26, secured to a sleeve loosely mounted on the shaft of screw 5 of hopper 3. By means of a clutch 27, one member of which is fast to sleeve 26 and the other to shaft of screw 5 of hopper 3, and hand-lever 28, secured to one member of the clutch, motion may be transmitted from shaft 5 of hopper 3 to shaft 5 of hopper 4. I preferably provide a clutch in this connection in order to permit the throwing out of operation of the hopper containing the cullet, should that be desired at any time. It will be understood, of course, that any suitable means may be employed for driving these different screws.

Many departures from and modifications in the device shown in the drawings may of course be made without departing from my invention. It will of course be obvious that the device for mixing the ingredients and the device for feeding the mixture into the furnace may be used separately one without the other, if desired.

By means of my improvement the ingredients necessary for making glass are automatically and evenly mixed in the proper proportions without any clogging of the machine, and such mixture is automatically fed to a furnace. A great saving of labor is thereby effected with a largely-increased economy in the manufacture of glass. The proportions of the various ingredients can be more accurately followed out than where the ingredients are mixed or are fed to the furnace by hand. The quality of glass produced can therefore be made more even and regular. By the use of my improvement the ingredients can also be more thoroughly mixed than by hand. This produces a better and more even quality of glass. A much larger proportion of cullet can also be employed where my improvement is used without clogging than where the ingredients are mixed by hand, thus cheapening the manufacture of many kinds of glass.

I am aware that heretofore attempts have been made to mix batch automatically by means of worms turning at the bottom of hoppers. In all such apparatus, however, the sand or other material tends to clog the apparatus. To avoid this, it has been found necessary to make the opening from the hopper into the chamber containing the worm comparatively small, and in such a hopper it not unfrequently happens that the sand or other ingredients will bank up and all feeding will stop for a time. Even when such an apparatus is not clogged the feed is apt to be uneven. By means of my improved worm provided with a tapering core all of these difficulties are overcome, clogging is prevented, the worm may run the entire length of a long hopper and be exposed to the material its whole length without clogging, the material is fed from all parts of the hopper, and banking of the material in the manner above described is prevented.

What I claim as new, and desire to secure by Letters Patent, is—

1. In a machine for mixing ingredients for making molten glass, the combination of a series of hoppers for the different ingredients closed at their lower parts, a screw in the bottom of each hopper running through substantially the length of the hopper to a discharge-orifice therein and open to the hopper throughout its said length and provided with a core tapering toward the discharge end of the screw, driving mechanism for turning the screws, the hoppers, screws and driving mechanism being so constructed, arranged and combined as to feed the different ingredients out from the different hoppers in certain predetermined proportions, and a receiver adapted to receive the different ingredients discharged from the different hoppers, whereby the different ingredients may be automatically fed into the receiver in certain predetermined proportions.

2. In a machine for mixing ingredients for making molten glass, the combination of a series of hoppers for the different ingredients closed at their lower parts, the said hoppers varying in size in accordance with the proportion of the different materials to be used, a screw in the bottom of each hopper running through substantially the length of the hopper to a discharge-orifice therein and open to the hopper throughout its said length and provided with a core tapering toward the discharge end of the screw, driving mechanism for turning the screws, the hoppers, screws and driving mechanism being so constructed, arranged and combined as to feed the different ingredients out from the different hoppers in certain predetermined proportions, and a receiver adapted to receive the different ingredients discharged from the different hoppers, whereby the different ingredients may be automatically fed into the receiver in certain predetermined proportions.

3. In a machine for mixing ingredients for making molten glass, the combination of a series of hoppers for the different ingredients closed at their lower parts, a screw in the bottom of each hopper running through substantially the length of the hopper to a discharge-orifice therein and open to the hopper throughout its said length and provided with a core tapering toward the discharge end of the screw, driving mechanism for turning the screws, the hoppers, screws and driving mechanism being so constructed, arranged and combined as to feed the different ingredients out from the different hoppers in certain predetermined proportions, a receiver adapted to receive the different ingredients discharged from the different hoppers, and means for automatically feeding the mixed ingredients to the furnace, whereby the different ingredients for making glass may be automatically fed to the furnace in certain predetermined proportions.

4. In a machine for mixing ingredients for making molten glass, the combination of a series of hoppers for the different ingredients closed at their lower parts, a screw in the bottom of each hopper running through substantially the length of the hopper to a discharge-orifice therein and open to the hopper throughout its said length and provided with a core tapering toward the discharge end of the screw, driving mechanism for turning the screws, the hoppers, screws and driving mechanism being so constructed, arranged and combined as to feed the different ingredients out from the different hoppers in certain predetermined proportions, a conveyer adapted to receive the different ingredients discharged from the different hoppers and to convey them to a mixing-chamber, a mixing-chamber closed at its lower parts, a screw in the bottom of said mixing-chamber running through substantially the length of said chamber to a discharge-orifice therein and open to the said chamber throughout its said length and provided with a core tapering toward the discharge end of the screw, and means for driving the screw to feed the mixed ingredients to the furnace, whereby the different ingredients for making glass may be automatically mixed in certain predetermined proportions, and be automatically fed to the furnace.

5. In a machine for mixing ingredients for making molten glass, the combination of a series of hoppers for the different ingredients closed at their lower parts, a screw in the bottom of each hopper running through substantially the length of the hopper to a discharge-orifice therein and open to the hopper throughout its said length and provided with a core tapering toward the discharge end of the screw, driving mechanism for turning the screws, the hoppers, screws and driving mechanism being so constructed, arranged and combined as to feed the different ingredients out from the different hoppers in certain predetermined proportions, a conveyer adapted to receive the different ingredients discharged from the different hoppers and to convey them to a receptacle, means for raising the said ingredients and delivering them to a receiving-hopper, a receiving-hopper arranged in proximity to the furnace and closed at its lower parts and provided with an orifice connecting with the furnace, a screw in the bottom of the receiving-hopper running through substantially the length of the hopper to said discharge-orifice and open to the hopper throughout its length and provided with a core tapering toward the discharge end of the screw, and a furnace provided with an opening connecting with the discharge-orifice of the receiving-hopper, whereby the different ingredients may be automatically mixed in proper proportions and be automatically conveyed to and fed into the furnace.

In testimony whereof I have signed my name to this specification in the presence of two subscribing witnesses.

HENRY M. BROOKFIELD.

Witnesses:
EDWIN SEGER,
JOHN O. GEMPLER.